(12) United States Patent
Prasad et al.

(10) Patent No.: US 7,668,948 B2
(45) Date of Patent: Feb. 23, 2010

(54) STAGGERED TIME ZONES

(75) Inventors: Ajith Prasad, Bangalore (IN); Vishram Sarurkar, Bangalore (IN); Simon Sabato, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1621 days.

(21) Appl. No.: 10/334,248

(22) Filed: Dec. 31, 2002

(65) Prior Publication Data

US 2005/0071395 A1 Mar. 31, 2005

(51) Int. Cl.
*G06F 15/16* (2006.01)
*G06F 12/00* (2006.01)
*G06F 15/173* (2006.01)

(52) U.S. Cl. .......... 709/223; 709/248; 707/206
(58) Field of Classification Search .......... 709/201, 709/223, 248; 707/206
See application file for complete search history.

(56) References Cited

U.S. PATENT DOCUMENTS 6,067,608 A * 5/2000 Perry .......... 711/203

* cited by examiner

*Primary Examiner*—Rupal D Dharia
*Assistant Examiner*—Tanim Hossain
(74) *Attorney, Agent, or Firm*—Buckley, Maschoff & Talwalkar LLC

(57) ABSTRACT

A method, apparatus, and system for staggering time zones.

30 Claims, 8 Drawing Sheets

Staggered Aging Method

Table Aging System

Aging Engine

STAGGERED TIME ZONES

BACKGROUND OF THE INVENTION

In certain computer networks including, for example, the Internet, data structures and tables exist for holding data. That data may include tasks to be performed or data on which an action is to be taken. Embodiments of the present invention are directed to removing one or more least recently used entries from a data structure, referred to herein as a "table." The process of removing least recently used entries is generally referred to herein as "aging." Aging may also apply to removal of all entries or a portion of entries existing in a table that are not accessed in a specified period of time. Aging is used in many applications including, for example, L2 MAC address aging, IP address aging, or L4 port aging.

BRIEF DESCRIPTION OF THE DRAWINGS

The subject matter regarded as embodiments of the invention is particularly pointed out and distinctly claimed in the concluding portion of the specification. Embodiments, however, both as to organization and method of operation, together with objects, features, and advantages thereof, may best be understood by reference to the following detailed description wherein like reference numerals are employed to designate like parts or steps, when read with the accompanying drawings in which:

DETAILED DESCRIPTION OF THE INVENTION

Figure 1:
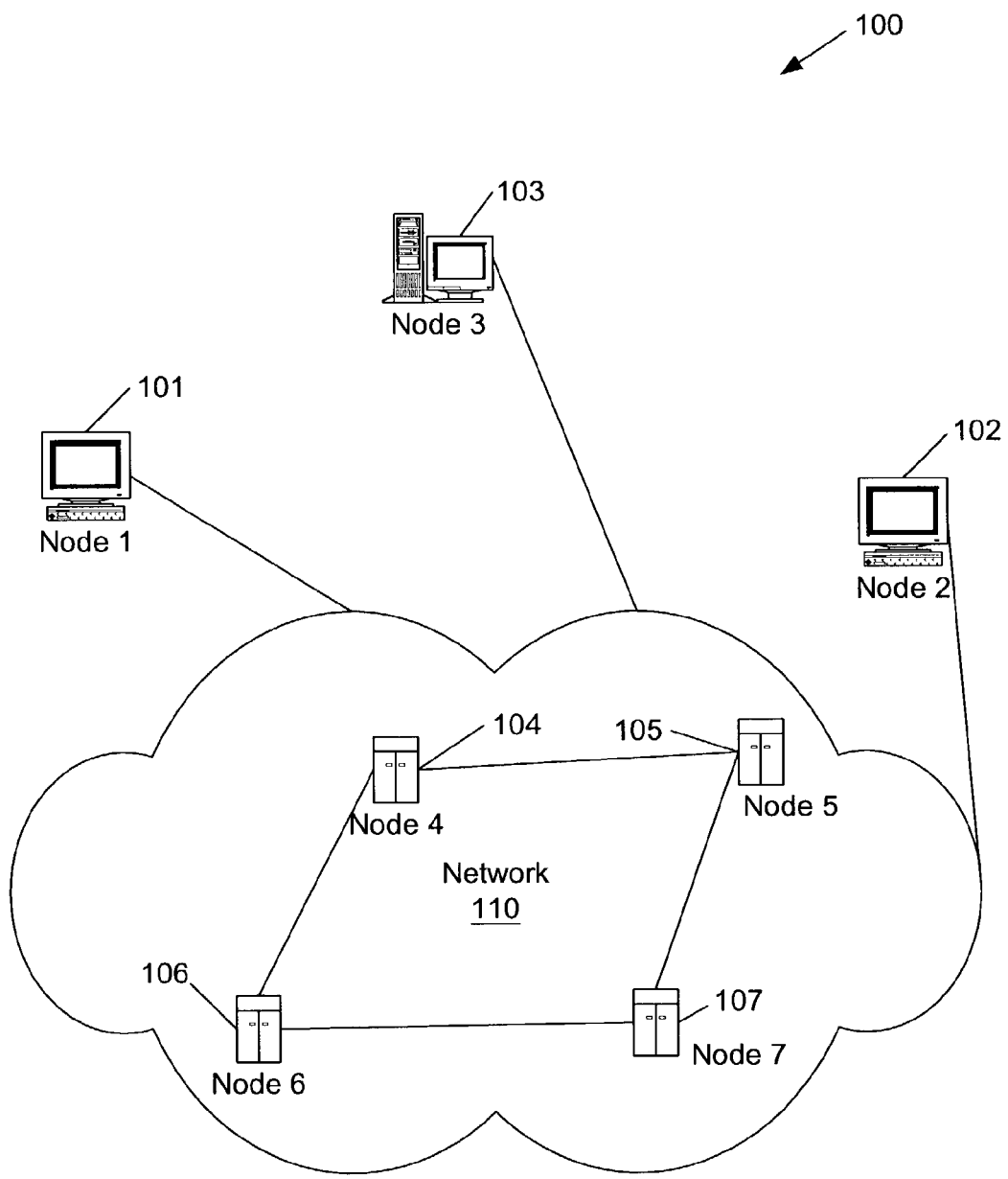
FIG. 1 is a block diagram of a system suitable for practicing an embodiment of the invention.

Reference will now be made in detail to the preferred embodiments of the present invention, examples of which are illustrated in the accompanying drawings. It is to be understood that the Figures and descriptions of embodiments of the present invention included herein illustrate and describe elements that are of particular relevance, while eliminating, for purposes of clarity, other elements found in typical computers and computer networks.

The present table aging techniques provide solutions to the shortcomings of certain table aging techniques, particularly those having large peak access rates since lower priority tasks are more likely to remain in a queue for an undesirably long period of time when peak access rates are large. Those of ordinary skill in table aging technology will readily appreciate that the table aging techniques, while described in connection with network switches or routers, is equally applicable to other aging functions including aging of any type of table or a situation in which entries in a database are periodically stamped. Other details, features, and advantages of the table aging techniques will become further apparent in the following detailed description of the embodiments.

Any reference in the specification to "one embodiment," "a certain embodiment," or a similar reference to an embodiment is intended to indicate that a particular feature, structure, or characteristic described in connection with the embodiment is included in at least one embodiment of the invention. The appearances of such terms in various places in the specification are not necessarily all referring to the same embodiment. References to "or" are furthermore intended as inclusive so "or" may indicate one or the other ored terms or more than one ored term. It should be recognized that while embodiments of the present time zone techniques may refer to age zones, those techniques may be applied to time zones other than age zones. An age zone, for purposes of this application, may be any function that assists in removing an entry from a table.

The Internet is a network of nodes such as computers, dumb terminals, or other typically processor-based, devices interconnected by one or more forms of communication media. Typical interconnected devices range from handheld computers, mobile phones, personal digital assistants, and notebook PCs to high-end mainframe and supercomputers. The communication media coupling those devices include twisted pair, co-axial cable, optical fibers and wireless communication techniques such as use of radio frequency.

A node is any device coupled to the network including, for example, routers, switches, servers, and clients. Nodes may be equipped with hardware, software or firmware used to communicate information over the network in accordance with one or more protocols. A protocol may comprise a set of instructions by which the information signals are communicated over a communications medium. Protocols are, furthermore, often layered over one another to form something called a "protocol stack." In one embodiment, the network nodes operate in accordance with a packet switching protocol referred to as the Transmission Control Protocol (TCP) as defined by the Internet engineering Task Force (IETF) standard 7, Request for Comment (RFC) 793, adopted in September, 1981 (TCP Specification), and the Internet Protocol (IP) as defined by IETF standard 5, RFC 791 (IP Specification), adopted in September, 1981, both available from www.ietf.org (collectively referred to as the "TCP/IP Specification").

Nodes may operate as source nodes, destination nodes, intermediate nodes or a combination of those source nodes, destination nodes, and intermediate nodes. Information is passed from source nodes to destination nodes, often through one or more intermediate nodes. Information may comprise any data capable of being represented as a signal, such as an electrical signal, optical signal, acoustical signal and so forth. Examples of information in this context may include data related to metrics associated with a router, data related to metrics related to data transfer between routers, and so forth.

Stored data or information that is accessed occasionally or regularly may be stored in a database in, for example, a node coupled to such a network. Most commonly used data from the database may furthermore be stored in a table as table data in that or another node. The database of stored data may, for example, be stored in a storage device such as a hard drive, while the table of regularly used entries may be stored, for example, in memory. Access to memory is typically faster than access to a storage device. Thus, a purpose of duplicating stored data as table data may be that table data may be more quickly accessed than stored data. Commonly used data is often, therefore, stored in tables to increase the speed at which that data may be accessed. Those tables may be implemented using data structures such as, for example, linked lists, binary trees, and multiway B-trees. Moreover, the data that is most commonly used may vary over time and so it may be beneficial to update the table so that the table contains data that is most commonly used at the present time.

Routers and switches in data networks such as the Internet, wide area networks, or local area networks are nodes that may discover routes through the data network, communicate the discovered routes to other devices, or transmit packets along those routes. Routing information used by such routers and switches in transmitting information across one or more networks may be maintained in one or more databases with most commonly used data from the databases stored in a table. Thus, while embodiments of the invention may be utilized with any table, routing tables stored in routers or switches are used as an example application in which embodiments of the table aging technique may be utilized.

FIG. 1 illustrates a table aging system 100 in which embodiments of the present invention may be implemented. Node 1 101 and node 2 102 may be general purpose computers or client processors, while node 3 103 may be a server processor, any of which may include an implementation of an embodiment of the present invention. Nodes 1-3 101-103 are coupled to a network 110 and may communicate therewith. Node 4 104, node 5 105, node 6 106, and node 7 107 may be routers or switches within the network 110. Any of nodes 4-10 104-110 may also include an implementation of an embodiment of the present invention.

Figure 2:
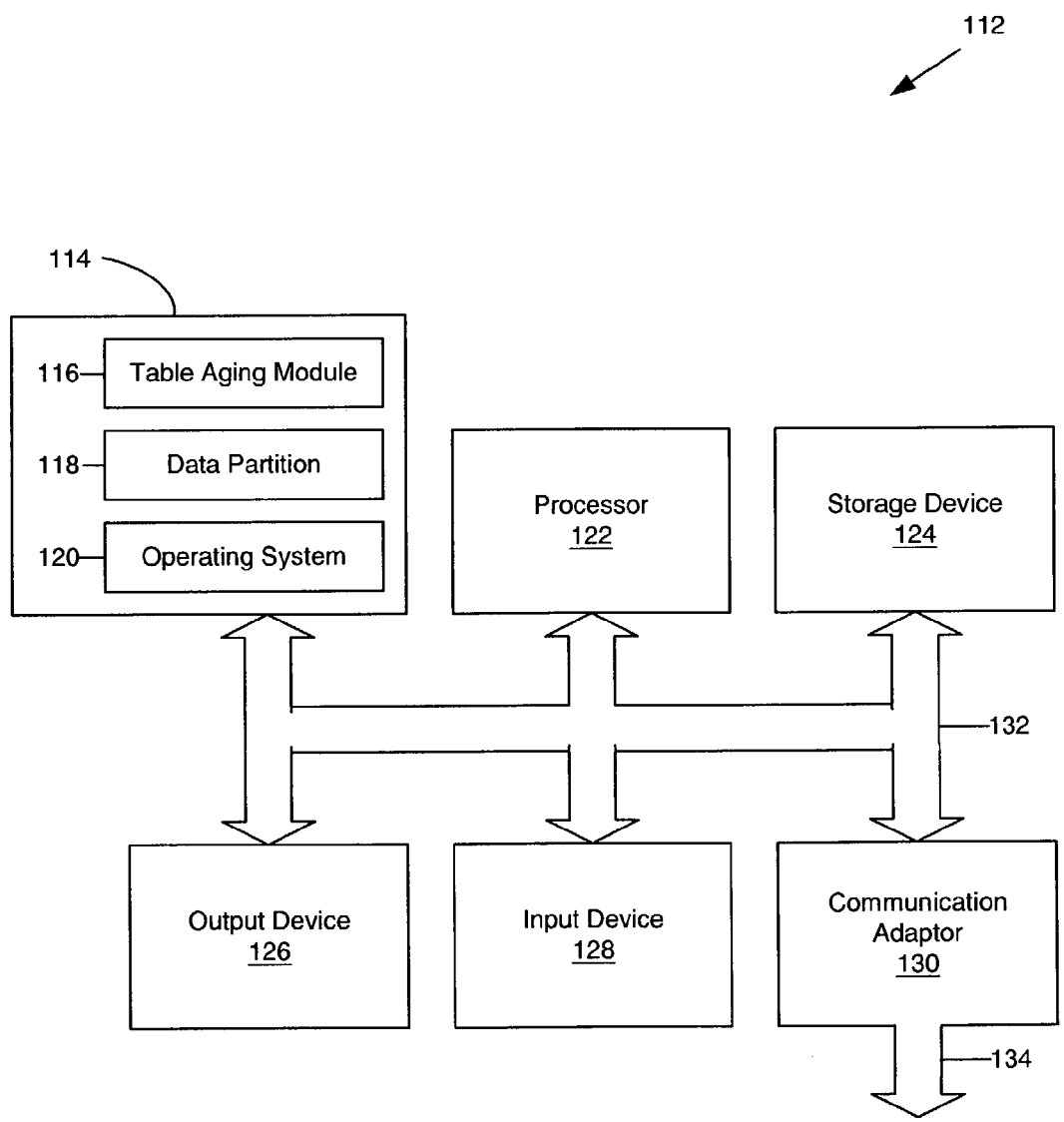
FIG. 2 is a block diagram of a device suitable for practicing an embodiment of the invention.

FIG. 2 illustrates a table aging device 112 in an embodiment in which table aging is performed in a router or switch. That table aging device 112 includes memory 114, a processor 122, a storage device 124, an output device 126, an input device 128, and a communication adaptor 130. Communication between the processor 122, the storage device 124, the output device 126, the input device 128, and the communication adaptor 130 may be accomplished by way of one or more communication busses 132. It should be recognized that the table aging device 112 may have fewer components or more components than shown in FIG. 2. For example, if a user interface is not desired, the input device 128 or output device 126 may not be included with the table aging device 112.

The memory 114 may, for example, include random access memory (RAM), dynamic RAM, and/or read only memory (ROM) (e.g., programmable ROM, erasable programmable ROM, or electronically erasable programmable ROM) and may store computer program instructions and information. The memory 114 may furthermore be partitioned into sections in which operating system 120 instructions are stored, a data partition 118 in which data is stored including, for example, one or more tables to be aged, and a table aging module 116 partition in which instructions for table aging are stored. The table aging module 116 partition may store program instructions and allow execution by the processor 122 of the program instructions to age tables related to one or more nodes 101-107. The data partition 118 may furthermore store data to be used during the execution of the program instructions such as, for example, a minor age zone counter.

The processor 122 may, for example, be an Intel® Pentium® type processor or another processor manufactured by, for example Motorola®, Compaq®, AMD®, or Sun Microsystems®. The processor 122 may furthermore execute the program instructions and process the data stored in the memory 114. In one embodiment, the instructions are stored in memory 114 in a compressed and/or encrypted format. As used herein the phrase, "executed by a processor" is intended to encompass instructions stored in a compressed and/or encrypted format, as well as instructions that may be compiled or installed by an installer before being executed by the processor.

The storage device 124 may, for example, be a magnetic disk (e.g., floppy disk and hard drive), optical disk (e.g., CD-ROM) or any other device that can store digital information. The communication adaptor 130 permits communication between the table aging device 112 and other devices or nodes coupled to the communication adaptor 130 at the communication adaptor port 134. The communication adaptor 130 may be a network interface that transfers information from nodes on a network to the table aging device 112 or from the table aging device 112 to nodes on the network. The communication adaptor 130 might also be another device that allows the data to flow between the processor 114 and an external device other than a node. The network may be a local or wide area network, such as, for example, the Internet, the World Wide Web, or the dynamic network routing system 100 illustrated in FIG. 1. It will be recognized that the table aging device 112 may alternately or in addition be coupled directly to one or more other devices through one or more input/output adaptors (not shown).

The table aging device 112 may also be coupled to one or more output devices 126 such as, for example, a monitor or printer, and one or more input devices 128 such as, for example, a keyboard or mouse. It will be recognized, however, that the table aging device 112 does not necessarily need to have an input device 128 or an output device 126 to operate. Moreover, the storage device 124 may also not be necessary for operation of the table aging device 112.

The elements 114, 122, 124, 126, 128, and 130 of the table aging device 112 may communicate by way of one or more communication busses 132. Those busses 132 may include, for example, a system bus, a peripheral component interface bus, and an industry standard architecture bus.

Embodiments of the staggered time zone may also be implemented in hardware that is not necessarily processor based. For example, those embodiments may be implemented in one or more state machines or control logic implemented in a chip. Those embodiments might for example, be embodied in one or more monolithic or hybrid integrated circuits. Those embodiments might alternately be based in memory with an associated piece of control logic that accesses the memory, stamps the age zone, and ages out the entries. In such embodiments, rather than instructions being executed, state transitions might be used to implement the staggering of time zones.

Aging of data in the table to retain current most used data and remove less used data from the table may be accomplished by utilizing an age zone timer that runs continuously and has a predefined zone period. The age zone timer may increment time or a counter over time to keep track of the passage of time. The incremented time or counter may return to a minimum value, such as zero or one, after reaching a maximum value, which may be any value desired. An age zone may be incremented each time the predefined period passes, as determined by passage of time at the age zone timer. An age stamp may furthermore be associated with each entry in the table. That age stamp may be updated to the value of the current age zone each time the entry is used. The value of the age stamp of an accessed entry may alternately be compared to the current age zone and updated only if those values are different. The predefined period is typically a longer period of time than the rate at which entries in the table are accessed so that a number of, often many, entry accesses will typically occur during each predefined period. Thus, the entries contained in the table may have the age stamp associated with each entry compared to the current age zone each time the predefined period passes to determine whether one or more entries in the table should be removed.

Each time the age zone changes value, one or more associated tables may be parsed to determine the time since the last use of each entry therein. For example, an age zone in a particular embodiment may cycle from zero to seven, thereby providing eight age zones. In that embodiment, the age zone may increment by one each time the predefined period passes. Thus, the age zone would increment from zero to one, one to two, and so on until it reverts from seven to zero. Table entries having an age stamp that is equal to the current age zone plus one may then be removed from the table. In that way, the oldest table entries, those that have not been used during the most recent age zones, are removed form the table. For example, if the current age zone value is five, then entries that were used during the last age zone would have age stamps of four, those entries last used during the previous age zone would have age stamps of three, etc., and those entries not used during the last six age zones would have age stamps of six. Those entries having age stamps of six, because they have not been used during the last six age zones, are therefore removed.

Reduced performance may be experienced after an age zone is incremented in embodiments wherein age stamp values of entries are changed only when the current age stamp is different than the current age zone value because the first time each entry is accessed after the age stamp value is changed, the entry must have its age stamp value updated. Thus, in the period following incrementing of the age zone, age stamp updating requirements peak because many age stamps must typically be updated. The number of age stamps that must be updated typically reduces as time elapses in an age zone because table entries that were accessed previously during that age zone will already have updated age stamps.

Access to memory, a storage device, or other devices in which the table may be stored has a limited bandwidth. Therefore, only a limited number of memory accesses may occur at any given time. Because of the peak demand that is typically placed on memory access by age stamp updates after an age zone has been updated, the bandwidth available for other memory accesses is reduced. Thus there may be a need for a system, an apparatus, and a method for reducing the number of memory accesses performed after an age zone change.

Figure 3:
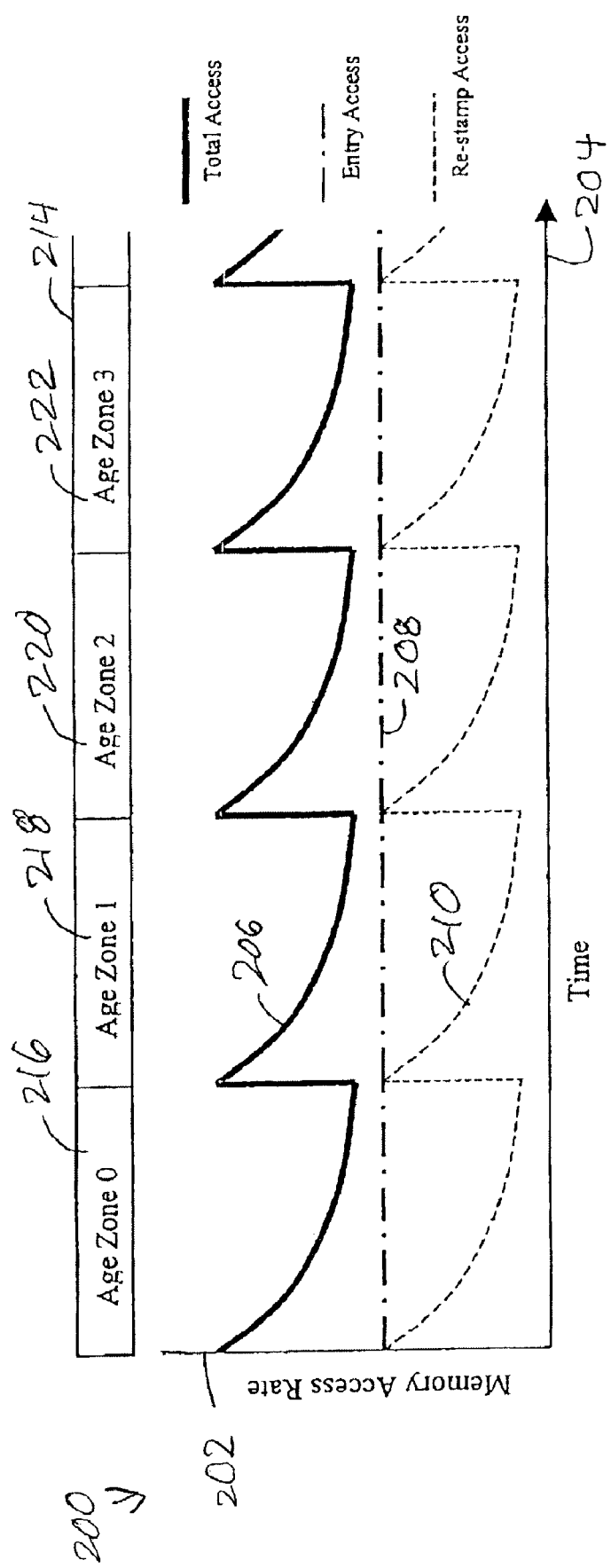
FIG. 3 is a timeline depicting access requirements due to table aging.
Figure 4:
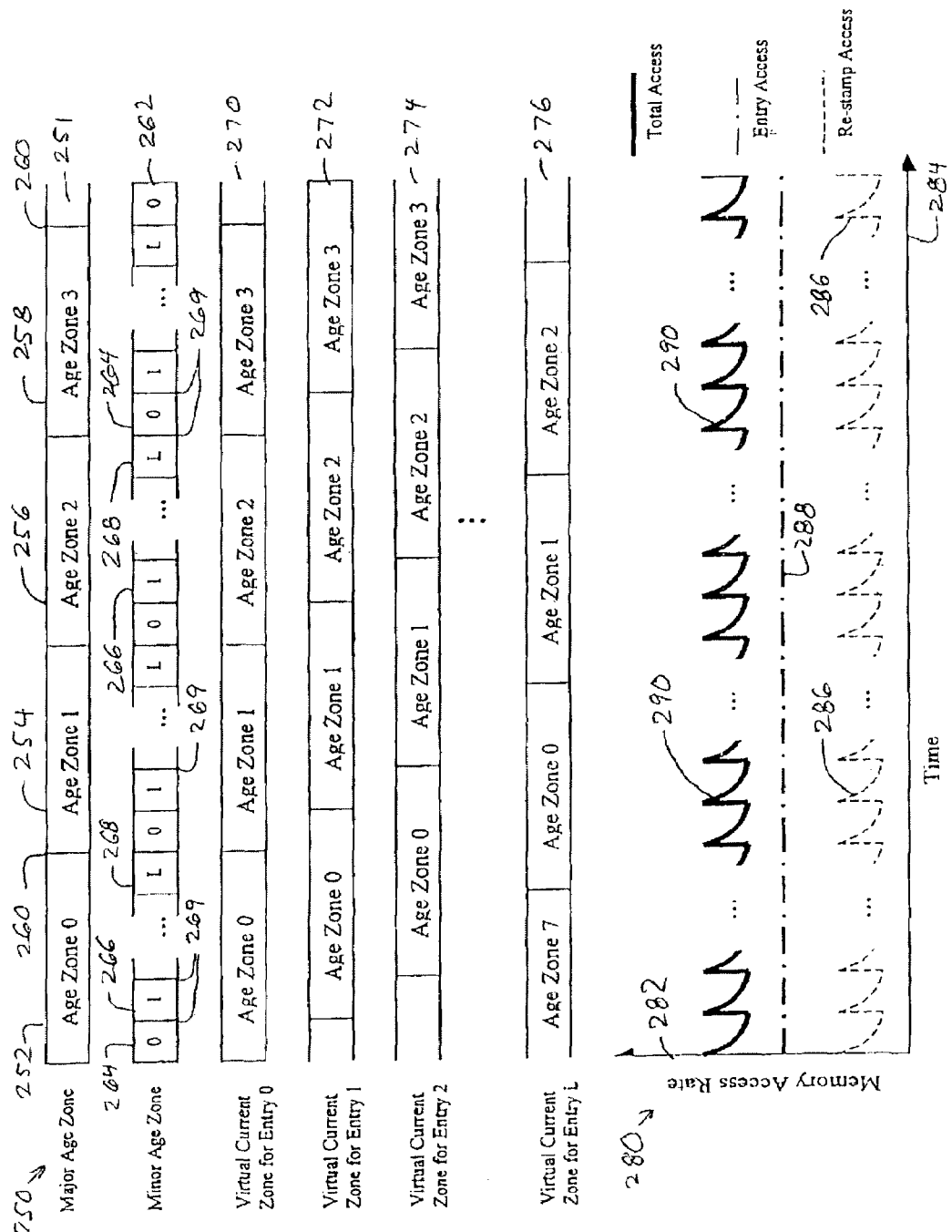
FIG. 4 is a timeline depicting access requirements in a staggered table aging embodiment of the invention.

The embodiment illustrated in FIGS. 3 and 4 utilize an address table in a network switch or router to provide an example of operation of an embodiment of the present invention. It should be recognized, however, that embodiments of the present invention may be utilized in other aging applications as well. It should also be recognized that, particularly applications where information needs to be updated regularly, accesses may peak at certain times. Embodiments of the present invention, therefore, provide apparatuses, systems, and methods for aging tables.

FIG. 3 is an access timeline 200 illustrating access requirements due to accessing and updating of age stamps. In that example, the table to be aged resides in the memory of a switch. Therefore, accesses are memory accesses. Memory accesses are shown on a vertical axis 202, with a greater number of accesses indicated by a higher line and chronology is shown on a horizontal axis 204, with time progressing to the right. A number of entry accesses is indicated by a dot-dashed entry access line 208, a number of update accesses is indicated by a dotted re-stamp access line 210, and a total number of memory accesses due to accessing and updating of age stamps is indicated by a solid total access line 206. Sample age zones are depicted as they may change over time at 214. Thus, age zone 1 218 follows age zone 0 216 at a time when the applicable zone period has elapsed, age zone 2 220 follows age zone 1 218 when the zone period elapses once again, and age zone 3 222 follows age zone 2 when the zone period elapses yet again.

As may be seen, peak memory access requirements follow age zone updates, with throughput requirements immediately after an age zone update sometimes nearly doubling throughput requirements just prior to an age zone update.

In an embodiment, the memory access throughput requirements for aging may be smoothed by utilizing a first-in/first-out device ("FIFO device"). In that embodiment, age stamp updates may be stored in the FIFO device and written to the entries at a rate that is less than the typical rate at which updates are required immediately after an age zone change, and at a rate that is great enough to write all required updates that would normally be experienced during an age zone. Thus, if each age zone has a duration of one second, with average peak age stamp updates of one per five milliseconds and average trough age stamp updates of one per fifty milliseconds, then a FIFO device may be utilized to writes an age stamp update every twenty milliseconds. Age zone update requirements would then be received at the FIFO device as they are required and written from the FIFO device to the appropriate entries in the order received at a rate of one every twenty milliseconds. If no updates were stored in the FIFO device, as is likely to occur prior to an age zone update in that example, then no update is performed at the expiration of the 20 millisecond period. In that way, age stamp update throughput requirements would be less than the peak requirements illustrated in FIG. 3 and greater than the lowest age stamp update throughput requirements illustrated in FIG. 3 and would be more constant (e.g., one update every 20 ms in the early portion of an age zone and dropping off somewhat at the end of an age zone) than the throughput requirements in the embodiment illustrated in FIG. 3.

Employment of a FIFO device, however, may have certain drawbacks. For example, the amount of storage that must be available to hold the FIFO information, may be prohibitively great because many entries may accumulate in the FIFO device during the early part of an age zone. In addition, the same entries could be queued for updating multiple times in the FIFO device while the first request is still pending in the FIFO device, thus exacerbating the FIFO device memory requirement. Such a FIFO device may approach or even exceed the memory requirements of the aging table that it is supporting. Use of a FIFO device may, therefore, be impractical.

Another embodiment utilizing a FIFO device involves including in the FIFO device only entries that are not already included in the FIFO device. That system, however, requires more processing overhead to determine whether an entry is already in the FIFO device.

Yet another FIFO device embodiment limits the size of the FIFO device information and ignores entry update requests that are received by the FIFO device once the FIFO device is filled. A drawback to that approach is that an update may be missed when the FIFO device is filled and a table entry may be improperly removed due to aging because that update was missed.

In an embodiment, age zones may be staggered to smooth table entry update bandwidth requirements. For example, virtual age zones may vary for different entries so that peak update requirements do not occur for all entries simultaneously. In that embodiment, the age zones delineated by expiration of the predefined period at the age zone timer may be referred to as "major age zones." Sequence numbers may be assigned to entries in the table being aged and may furthermore correspond to minor age zones. A minor age zone timer may be added having a number of steps equal to the number of sequence numbers and that completes one full cycle through those steps by the time a major age zone change occurs. Thus, for example, a table having ten entries may assign sequence number one to the first entry, sequence number two to the second entry and so on, assigning sequence number ten to the tenth entry. The minor age zone timer may, correspondingly, have ten steps.

It may be noted that the sequence number associated with the table entries need not necessarily be stored as an additional item in memory, but may simply be a function of the address of the entry. It should also be noted that a sequence number my be associated with more than one entry so that, for example, a table having fifty entries may be associated with a minor age zone timer having ten steps by grouping the entries in groups of five.

A virtual age zone is an effective age zone calculated for an entry as a function of the major age zone, minor age zone and the sequence number having the effect that the virtual age zone for various entries will be staggered from each other. The virtual age zone need not be stored or counted for every entry because it may be calculated as needed based on the major age zone and minor age zone. In operation, the virtual age zone for an entry may be set equal to the current major age zone when the minor age zone is equal to the sequence number of that entry. Thus, the virtual age zone for a sequence number may be maintained at the current major age zone minus one until the minor age zone corresponding to that sequence number is reached. The virtual age zone may then be set equal to the major age zone when the minor age zone reaches a value that corresponds to the sequence number of the entry. Restated, if the sequence number of an entry is less than the minor age zone then the virtual age zone for that entry may be set equal to the major age zone minus one. If the sequence number of an entry is greater than or equal to the minor age zone then the virtual age zone for that entry may be set equal to the major age zone.

Other variations on that equation may also serve to stagger virtual age zone switchover. Functions of the major age zone, minor age zone and sequence number that gives a unique, staggered, and consistent value may be utilized for staggering. For example, if the sequence number of an entry is less than or equal to the minor age zone then the virtual age zone for that entry may be equal to the major age zone minus one. If the sequence number of an entry is greater than the minor age zone then the virtual age zone for that entry may be equal to the major age zone. The entry or set of entries having a sequence number will thereby change to a new virtual age zone only when the minor age zone reaches the sequence number associated with those entries, thus staggering the virtual age zone associated with various entries throughout the major age zone.

A minimal amount of memory will allow the staggered virtual age zone to be staggered in many minor age zone steps. For example, consider a table having sixteen thousand entries. A 14-bit counter for the minor age zone is all that may be required to split each major age zone into sixteen thousand minor age zones. Thus, with a 14-bit counter, sixteen thousand staggered virtual age zones could be achieved such that every entry would be staggered individually. That could, in turn, create a very smooth update demand so that bandwidth requirements are very steady throughout the aging process.

FIG. 4 illustrates a staggered virtual age zone timeline 250 for an embodiment of staggered table aging wherein the table is stored in memory. At 251, a major age zone timeline is depicted. On the major age zone timeline 250 age zone 0 252, age zone 1 254, age zone 2 256, age zone 3 258 are depicted and major time zone delineations 260 are depicted where age zones 252-258 change. At 262, minor age zone 0 264, minor age zone 1 266 and minor age zone L 268 are depicted wherein minor age zone L 268 is the last minor age zone. Minor time zone delineations 269 are depicted where minor age zones 264-268 change. Any number of age zones desired may be utilized since the memory requirement for a large number of minor age zone increments is minimal.

At 270 a current virtual age zone timeline is depicted for a table entry having a sequence number of zero. As may be seen, the virtual age zone for the table entry having a sequence number of zero changes to match the major age zone each time the minor age zone increments to zero in this example. Thus, when the minor age zone changes to zero 264 at the minor age zone delineation 269 at the beginning of minor age zone 0 264, virtual age zone 0 on the current virtual age zone 0 timeline 270 is made equal to the value of the current major age zone 252-258.

At 272, a current virtual age zone timeline is depicted for a table entry having a sequence number of one. As may be seen, the virtual age zone for the table entry having a sequence number of one changes to match the major age zone each time the minor age zone increments to one. At 274, a current virtual age zone timeline is depicted for a table entry having a sequence number of two. The virtual age zone for the table entry having a sequence number of two changes to match the major age zone each time the minor age zone increments to two. At 276, a current virtual age zone timeline is depicted for a table entry having a sequence number of L, L being the last minor age zone value and the last sequence number value, where that last value may be any value desired. As may be seen, the virtual age zone for the table entry having a sequence number of L changes to match the major age zone each time the minor age zone increments to L.

At 280, a staggered access timeline illustrates memory accesses corresponding to the staggered virtual age zone timeline 250. The staggered access timeline 280 is organized similarly to the access timeline 200 illustrated in FIG. 3, with memory accesses shown on the vertical axis 282, time shown on the horizontal axis 284, a number of entry accesses indicated by a dot-dashed entry access line 288, a number of update accesses indicated by a dotted re-stamp access line 286, and a total number of memory accesses due to accessing and updating of age stamps indicated by a solid total access line 290. The quantity of entry accesses shown on the entry access line 286 of FIG. 4 is similar to the number of entry accesses shown on the entry access line 208 of FIG. 3. Unlike the re-stamp access line 210 of FIG. 3 that peaks at the beginning of each age zone 216-222, however, the re-stamp access line 286 of FIG. 4 peaks at the beginning of each minor age zone 264-268. Thus the re-stamp access peaks on the staggered access timeline 280 are much smaller than the re-stamp access peaks on the unstaggered access timeline 200. The peaks on the total access timeline 290 on the staggered access timeline 280, being equal to the number of entry accesses plus the number of re-stamp access, are lower than the peaks on the total access timeline 206 on the unstaggered access timeline 200.

To prevent slowed operation speed of a processor due to memory accesses, memory throughput is typically designed to accommodate the memory access requirements of all modules being executed by that processor. Accordingly, where peaks in table aging memory access requirements are consistent and occur on a regular basis, total throughput requirements are typically designed to accommodate that peak table aging memory access load in addition to all other throughput requirements. Thus, the reduction of peak throughput requirements using the staggered table aging strategy may reduce the total memory throughput required.

Thus, methods for aging a table are contemplated herein. In one embodiment, the age zone is divided into a plurality of minor age zones, each having a minor age zone step value. A sequence number that corresponds to one of the minor age zone step values is then assigned to a table entry. A virtual age zone is set equal to a current major age zone step value when the sequence number corresponds to a current minor age zone step value and an age stamp for an entry is set equal to the virtual age zone value when that entry is accessed. The entry is removed from the table as a function of the age stamp and the virtual age zone such as, for example, when the age stamp is equal to the virtual age zone plus one.

In another embodiment, a method of removing an entry from a table containing a plurality of entries is contemplated. A desired range of minor age zone values is established and a sequence number to each entry that is within the range of minor age zone values is assigned in that embodiment. A major age zone is incremented each time a predefined period of time passes and reset to a minimum value when the major age zone reaches a maximum value. The minor age zone is also incremented and reset to a minimum value each time the major age zone increments. A table entry age stamp is set equal to the major age zone as a function of the age stamp and the virtual age zone. The table entry is then removed as a function of the age stamp and the virtual age zone.

In an embodiment, an article of manufacture is contemplated. The article of manufacture includes a computer readable medium having stored thereon instructions which, when executed by a processor, cause the processor to perform the functions described in one or more of the embodiments described herein.

A table aging device is also contemplated, wherein the table aging device includes a processor that performs the functions described in one or more of the embodiments described herein. That table aging device may establish a desired range of minor age zone values and assign a sequence number within the range of minor age zone values to each entry. The device may increment a major age zone each time a predefined period of time passes, reset the major age zone to a minimum value when the major age zone reaches a maximum value, and reset the minor age zone to a minimum value each time the major age zone increments. The device may also set a table entry age stamp equal to the major age zone when the minor age zone is a function of the sequence number of the table entry and the entry is accessed. The table entry may then be removed from the table as a function of the age stamp and the virtual age zone and the minor age zone may be incremented.

In another embodiment, a method of aging a table includes dividing an age zone into a plurality of minor age zones, each having a minor age zone step value and assigning a sequence number to a table entry. A virtual age zone is set equal to a current major age zone step value when a current value of the minor age zone step value is greater than or equal to the sequence number. The virtual age zone is set equal to the current major age zone step value minus one when the current value of the minor age zone step value is less than the sequence number. The entry is removed from the table when the age stamp is a function of the virtual age zone.

In yet another embodiment, a method of staggering periodic stamping of entries is contemplated. That method includes dividing the age zone into a plurality of minor age zones, each having a minor age zone step value and assigning a sequence number that corresponds to one of the minor age zone step values to a table entry. A virtual age zone is set based on the major age zone, minor age zone, and sequence number and an age stamp for the entry is set equal to the virtual age zone value when the entry is accessed after a virtual age zone change.

Figure 5:
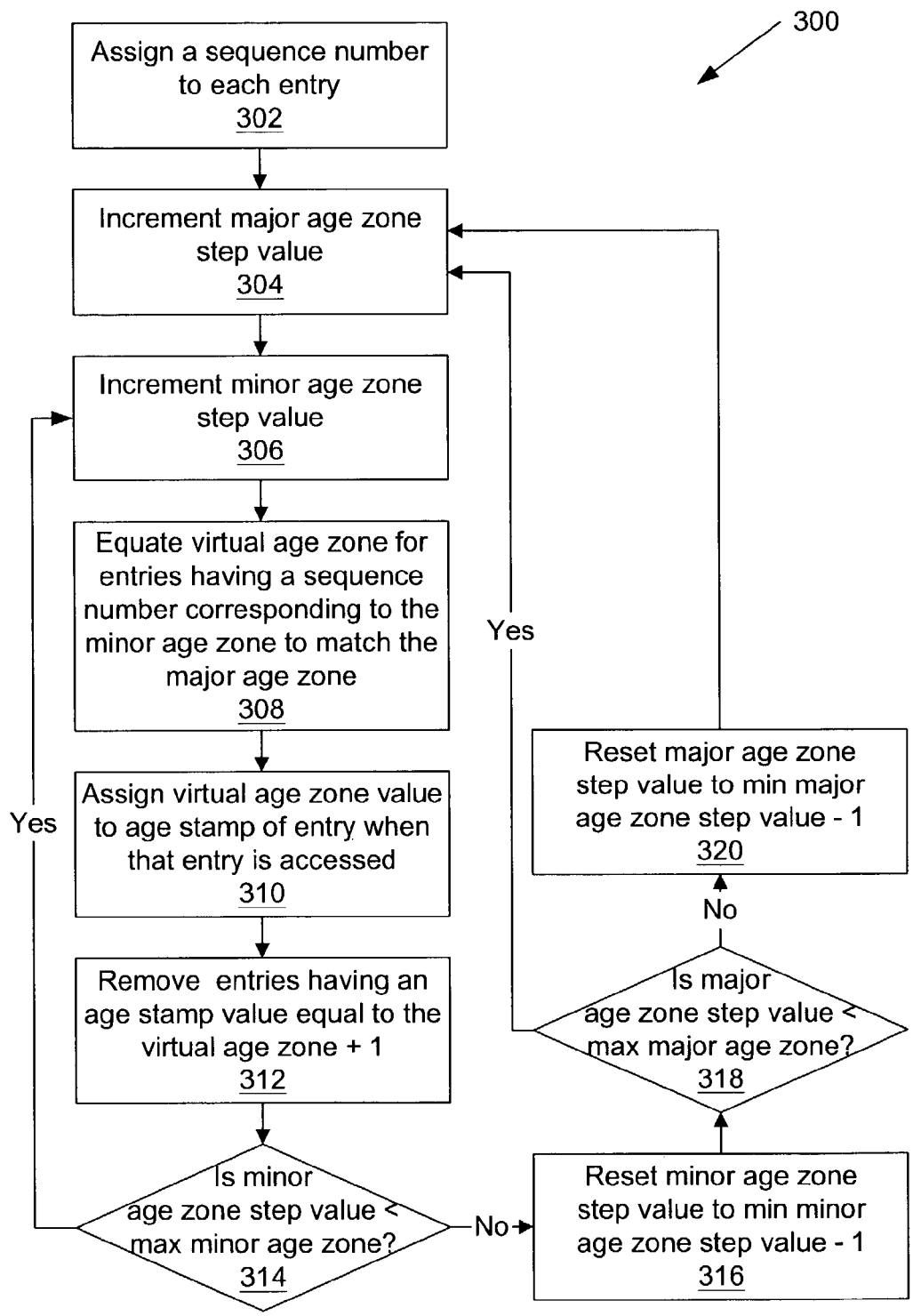
FIG. 5 is a flowchart depicting a staggered aging method in an embodiment of the invention.

FIG. 5 illustrates a staggered aging method 300 for removing one or more aged entries from a table. The method includes associating a sequence number with each entry to be aged in a table at 302. In a table wherein every entry is to be aged, a sequence number may be assigned to every entry. At 304, a major age zone step value is incremented each time the predefined zone period passes. In the present stepped embodiment, each major time zone is divided into a plurality of minor age zones. A minor age zone step value increments through the minor age zones at 306. Those step values correspond to the sequence numbers in this embodiment. In a simple embodiment, for example, minor age zone zero may have a step value of zero and correspond to sequence number zero, minor age zone one may have a step value of one and correspond to sequence number one, etc. Other correspondences may, however, be established between sequence numbers and step values, or even minor age zones where appropriate or desired. Minor age zones may be of equal size, with size defined by a period of time, such that the step value increments through every minor age zone during the predefined time that each major age zone exists.

At 308, the virtual age zone for each entry having a sequence number that corresponds to the current minor age zone step value is equated to the current major age zone value. It should be recognized that an age stamp for an entry may not necessarily be updated when the virtual age zone changes for that entry. The age stamp may only be updated when the entry is accessed in the depicted embodiment. Thus, the virtual age zone for an entry may simply contain a value to be written to the age stamp of the entry when that entry is accessed, which is performed at 310.

In another embodiment of the invention, a database could be updated periodically, staggering a period stored therein using virtual age zones.

As has previously been suggested, one or more entries may have a sequence number that corresponds to the current minor age zone step value so that only one entry may have an updated virtual age zone each time the minor age zone step value increments, or multiple entries may have an updated virtual age zone each time the minor age zone step value increments.

At 312, all entries having an age stamp value equal to the virtual age zone plus one may be removed because they have not been used in the desired timeframe.

At 314, a determination is made as to whether the minor age zone step value is less than the maximum minor age zone value, wherein the maximum minor age zone value may be the value assigned to the last minor age zone. If the minor age zone step value is less than the maximum minor age zone value, then the minor age zone step value may be incremented at 306 and the process described at 308-312 may be repeated for the new minor age zone step value. If the minor age zone step value is not less than the maximum minor age zone value, then the minor age zone step value may be reset to the minimum minor age zone step value minus one at 316. Thus, where ten minor age zones are desired and designated by the values zero through nine, the minimum age zone step value would be zero and the maximum minor age zone value would be nine. Moreover, after a minor age zone having a value of nine has terminated, the minor age zone step value would return to one.

After resetting the minor age zone step value at 316, a determination is made at 318 as to whether the major age zone step value is less than the maximum major age zone value, wherein the maximum major age zone value may be the value assigned to the last major age zone. In an example wherein the major age zone step value increments from zero to seven, the maximum major age zone step value would be seven. If the major age zone step value is less than the maximum major age zone value, then the major age zone step value may be incremented at 304 and the process described at 306-312 may be repeated for the new major age zone step value. If the major age zone step value is not less than the maximum major age zone value, then the major age zone step value may be reset to the minimum major age zone step value, in this example zero, minus one at 320 and the process may begin anew at 304.

It should be recognized that portions of the staggered aging method 300 may be performed simultaneously. For example, the sequence number may be may assigned at 302 and the minor age zone may be incremented at 306 simultaneously.

Figure 6:
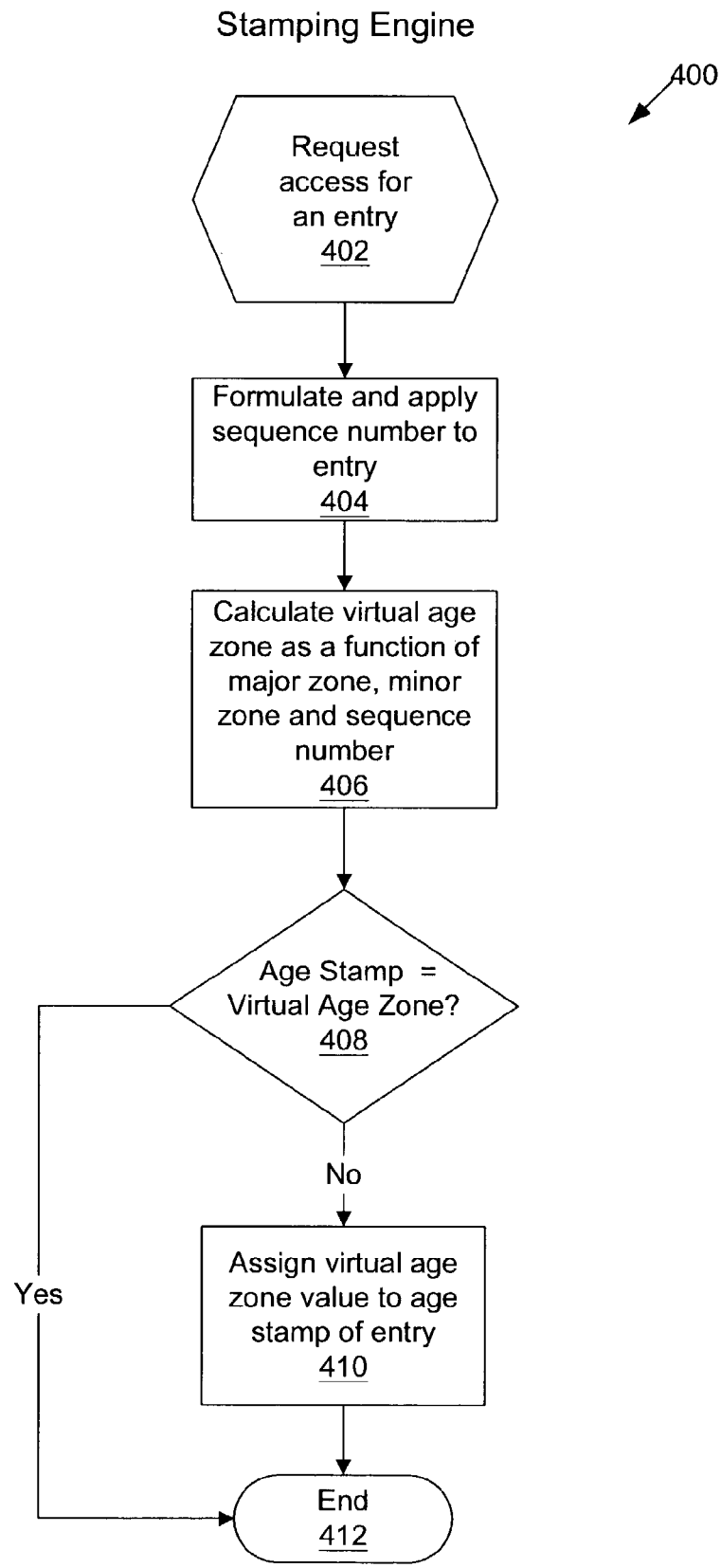
FIG. 6 is a flowchart depicting a stamping engine of an embodiment of the invention.

FIG. 6 illustrates a stamping engine 400 for stamping a table entry. The method is utilized when there is a request to access an entry at 402. A sequence number is formulated and applied to the entry at 404. At 406, a virtual age zone for the entry is calculated as a function of the major age zone, minor age zone and sequence number. At 408, a decision is made ass to whether the age stamp of the entry is equal to the virtual age zone. If the age stamp of the entry is equal to the virtual age zone, stamping is complete and an iteration of the engine is terminated at 412. If the age stamp of the entry is not equal to the virtual age zone, a virtual age zone value is assigned to the age stamp of the entry at 410 and an iteration of the stamping engine 400 is terminated at 412.

Figure 7:
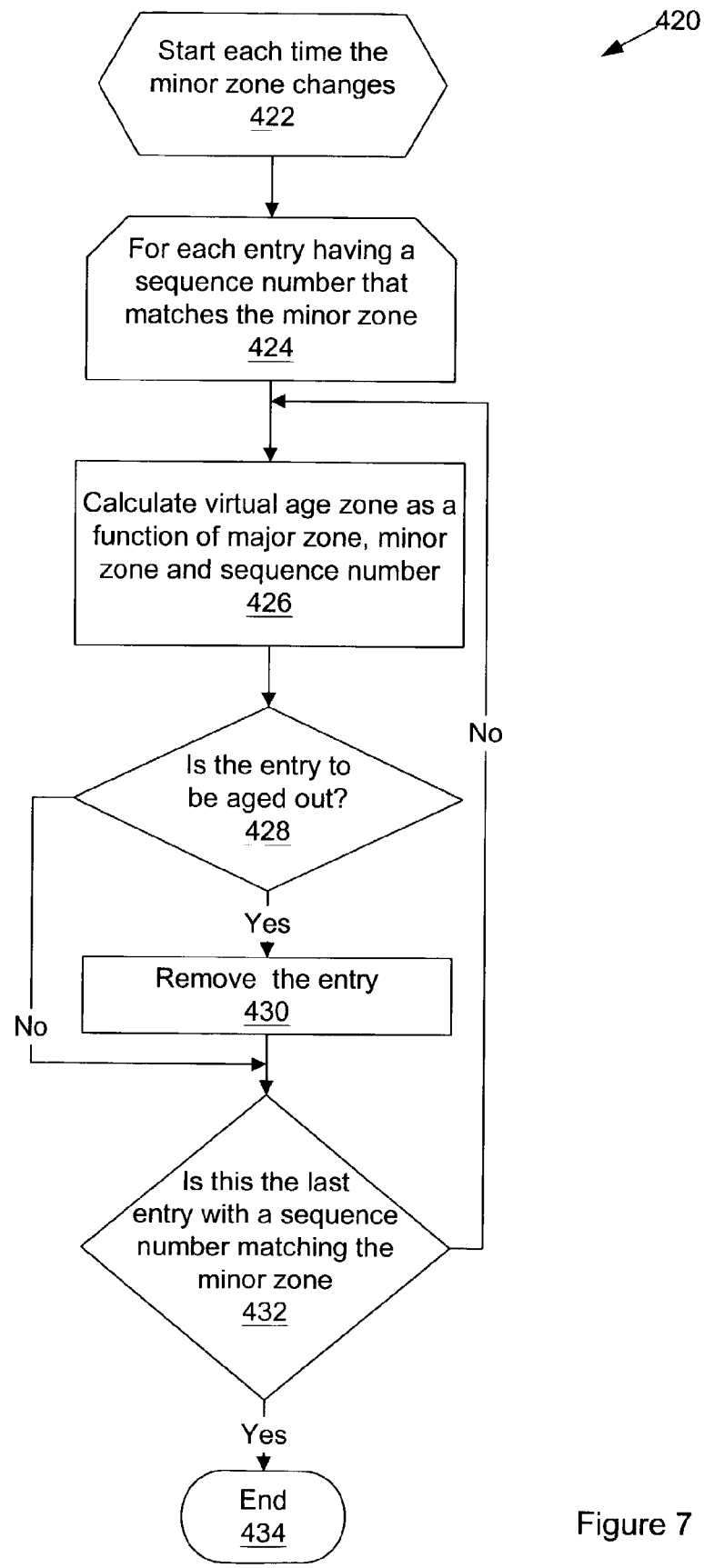
FIG. 7 is a flowchart depicting an aging engine of an embodiment of the invention.

FIG. 7 illustrates an aging engine 420 that removes an aged entry from a table. That engine begins operation when a minor zone changes at 422. At 424, every entry having a sequence number that matches the minor zone is affected. A virtual age zone value for each of those affected entries is calculated at 426 as a function of the current major zone, minor zone, and sequence number. At 428, a decision is made as to whether the entry is to be removed from the table. Removal is based on a function of the age stamp and the virtual age zone as described hereinbefore. If the entry is to be removed, that removal occurs at 430. At 432, the entry removal decision of 426-430 is repeated for each entry having a sequence number matching the minor zone and an iteration of the aging engine 420 is terminated at 434.

Figure 8:
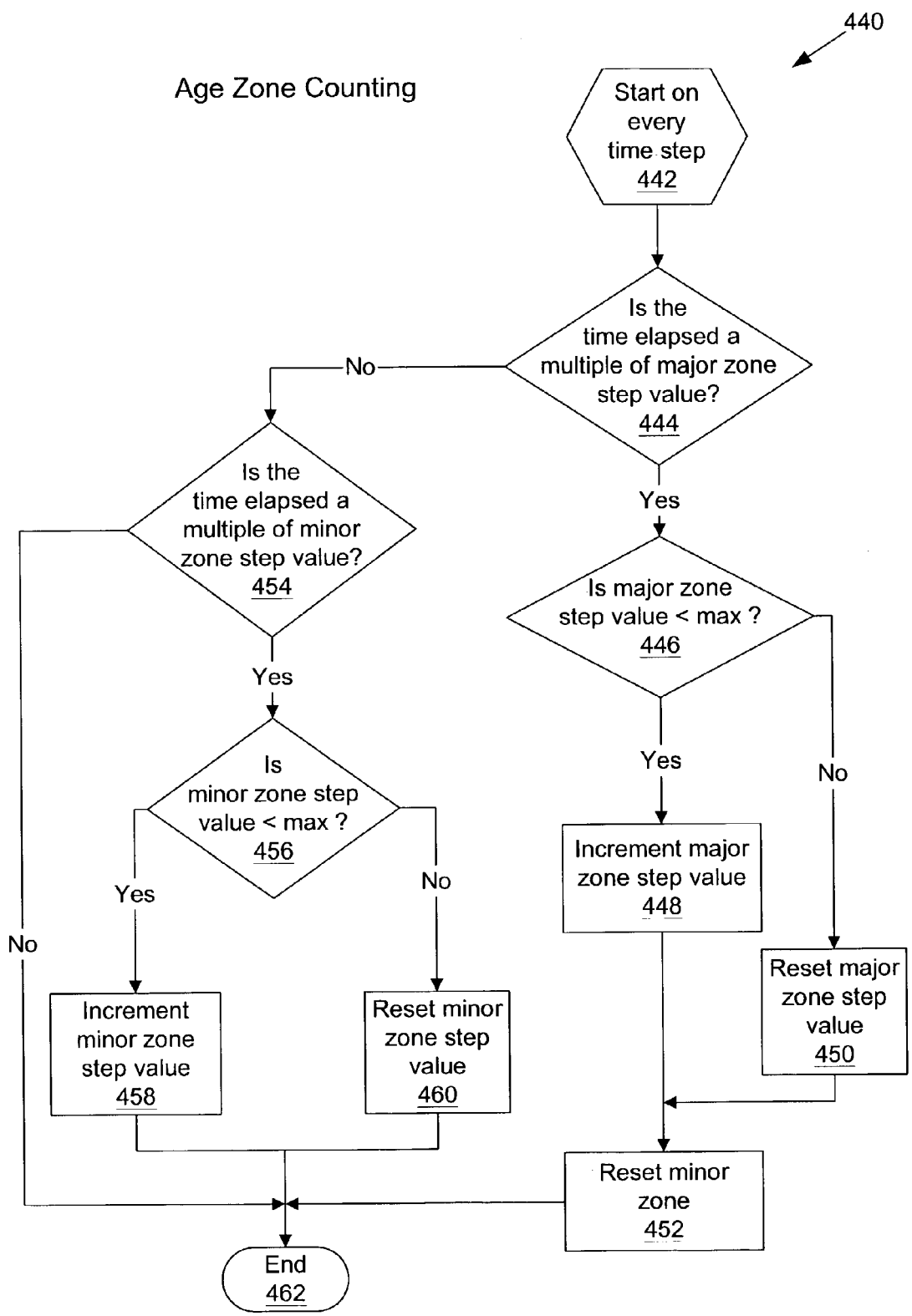
FIG. 8 is a flowchart depicting age zone counting in an embodiment of the invention.

FIG. 8 illustrates a method of age zone counting 440. That method may be performed at each time step at 442. A time step is a unit of time as a multiple of which the minor zone and major zone step values are defined. For example, in an embodiment the time step could be the period or cycle of the clock being used. In another embodiment the time step may be defined as a periodic interrupt from a timer. A decision as to whether elapsed time is a multiple of a major zone step value occurs at 444. If that elapsed time is a multiple of a major zone step value, then a determination is made as to whether the major zone has a step value that is less than the maximum value that the major zone is permitted to have at 446. If the major zone has a step value that is less than the maximum value that the major zone is permitted to have, then the major zone step value is incremented at 448. If the major zone does not have a step value that is less than the maximum value that the major zone is permitted to have, then the major zone step value is reset, for example to a minimum step value, at 450. At 452, the minor age zone is reset after either incrementing the major zone step value or resetting the major zone step value and an iteration of the age zone counting method 440 terminates at 462.

If that elapsed time is not a multiple of a major zone step value at 444, then a determination is made as to whether the elapsed time is a multiple of a minor age zone step value at 454. If the elapsed time is not a multiple of a minor age zone step value, then the process ends at 462. If the elapsed time is a multiple of a minor age zone step value, then a decision as to whether the minor zone step value is less than the maximum minor zone value is made at 456. If the minor zone step value is less than the maximum minor zone value, then the minor age zone step value is incremented at 458 and if the minor zone step value is not less than the maximum minor zone value, then the minor age zone step value is reset, for example to its minimum value, at 460. An iteration of the age zone counting method 440 terminates at 462.

While the table aging systems, apparatuses, and methods have been described in detail and with reference to specific embodiments thereof, it will be apparent to one skilled in the art that various changes and modifications can be made therein without departing from the spirit and scope thereof. For example, the table aging systems, apparatuses, and methods may be applied to tables other than those maintained in routers and switches. Also, while embodiments of the present time zone techniques refer to age zones herein, those techniques may be applied to time zones other than age zones. Thus, it is intended that the present invention cover the modifications and variations of this invention provided they come within the scope of the appended claims and their equivalents.

What is claimed is:

1. A method of staggering an age zone, comprising:
dividing, by using a processor, the age zone into a plurality of minor age zones, each having a minor age zone step value, wherein the age zone is associated with a first timer comprising a plurality of predefined zone periods, wherein each minor age zone is associated with a second timer, and wherein a complete cycle of the second timer represents one of the plurality of predefined zone periods;
assigning a sequence number that corresponds to one of the minor age zone step values to a table entry;
setting a virtual age zone equal to a current major age zone step value when the sequence number is a function of a current minor age zone step value;
setting an age stamp for the entry equal to the virtual age zone value when the entry is accessed; and
removing the entry from the table as a function of the age stamp and the virtual age zone.

2. The method of claim 1, wherein the sequence number is a function of the minor age zone step value when the sequence number is equal to the minor age zone step value.

3. The method of claim 1, wherein the age zone is defined by a predetermined period of time.

4. The method of claim 3, wherein the age zone has a major age zone step value that is incremented each time the predetermined period of time ends.

5. The method of claim 4, wherein the major age zone step value is incremented a predetermined number of times and set to a minimum value after reaching a maximum value.

6. The method of claim 1, wherein the minor age zone step value is set to a minimum value after reaching a maximum value.

7. The method of claim 1, wherein a table contains a plurality of entries and at least one entry has a sequence number that corresponds to each of the minor age zone values.

8. The method of claim 7, wherein the entries contain information expected to be used frequently by an application and the staggered aging method removes entries that are not used within a predefined period defined by a plurality of zones.

9. The method of claim 7, wherein the table is stored in memory of a general purpose computer and the method of staggering aging is performed in a processor communicating with the memory.

10. The method of claim 1, wherein the entry is removed from the table when the age stamp is equal to the virtual age zone plus one.

11. The method of claim 1, wherein the sequence number is a function of an address of the table entry.

12. The method of claim 1, wherein the age stamp for the entry is set equal to the virtual age zone value only the first time the entry is accessed after a change is made to the virtual age zone.

13. A method of removing an entry from a table containing a plurality of entries, comprising:
    establishing, by using a processor, a desired range of minor age zone values;
    assigning a sequence number within the range of minor age zone values to each entry;
    incrementing a major age zone each time a predefined period of time passes;
    resetting the major age zone to a minimum value when the major age zone reaches a maximum value;
    resetting the minor age zone to a minimum value each time the major age zone increments;
    setting a table entry age stamp equal to the major age zone as a function of the age stamp and a virtual age zone;
    removing the table entry as a function of the age stamp and the virtual age zone; and
    incrementing the minor age zone, wherein the major age zone is associated with a first timer comprising a plurality of predefined zone periods, wherein each minor age zone is associated with a second timer, and wherein a complete cycle of the second timer represents one of the plurality of predefined zone periods.

14. The method of claim 13, wherein the entry is removed from the table when the age stamp is equal to the virtual age zone plus one.

15. The method of claim 13, wherein the minor age zone is a function of the sequence number of the table entry when the minor age zone is greater than or equal to the sequence number.

16. The method of claim 13, wherein the minor age zone is incremented when a second predefined period passes and wherein the second predefined period is equal to the predefined period divided by the number of values in the desired range of minor age zone values.

17. The method of claim 13, wherein the age stamp is a function of the virtual age zone when the age stamp is equal to the virtual age zone plus one.

18. An article of manufacture comprising:
    a computer readable medium having stored thereon instructions which, when executed by a processor, cause the processor to:
    divide an age zone into a plurality of minor age zones, each having a minor age zone step value, wherein the age zone is associated with a first timer comprising a plurality of predefined zone periods, wherein each minor age zone is associated with a second timer, and wherein a complete cycle of the second timer represents one of the plurality of predefined zone periods;
    assign a sequence number that corresponds to one of the minor age zone step values to a table entry;
    set a virtual age zone equal to a current major age zone step value when the sequence number is a function of a current minor age zone step value;
    set an age stamp for the entry equal to the virtual age zone value when the entry is accessed; and
    remove the entry when the age stamp is a function of the virtual age zone.

19. The article of manufacture of claim 18, wherein the sequence number is a function of the minor age zone step value when the sequence number is equal to the minor age zone step value.

20. The article of manufacture of claim 18, wherein a table contains a plurality of entries and at least one entry has a sequence number that corresponds to each of the minor age zone values.

21. The article of manufacture of claim 18, wherein the age stamp is a function of the virtual age zone when the age stamp is equal to the virtual age zone plus one.

22. A table aging device, comprising:
    a processor containing instructions which, when executed by the processor, cause the processor to:
    establish a desired range of minor age zone values;
    assign a sequence number within the range of minor age zone values to a table entry;
    increment a major age zone each time a predefined period of time passes;
    reset the major age zone to a minimum value when the major age zone reaches a maximum value;
    reset the minor age zone to a minimum value each time the major age zone increments;
    set a table entry age stamp equal to the major age zone when the minor age zone is a function of the sequence number of the table entry and the entry is accessed;
    remove the table entry from the table as a function of the age stamp and a virtual age zone; and
    increment the minor age zone, wherein the major age zone is associated with a first timer comprising a plurality of predefined zone periods, wherein each minor age zone is associated with a second timer, and wherein a complete cycle of the second timer represents one of the plurality of predefined zone periods.

23. The device of claim 22, wherein the minor age zone is a function of the sequence number of the table entry when the minor age zone is greater than the sequence number.

24. The device of claim 22, wherein the age stamp is a function of the virtual age zone when the age stamp is equal to the virtual age zone plus one.

25. A method of aging a table entry, comprising:
    dividing, by using a processor, an age zone into a plurality of minor age zones, each having a minor age zone step value;
    assigning a sequence number to a table entry;
    setting a virtual age zone equal to a current major age zone step value when a current value of the minor age zone step value is greater than or equal to the sequence number;
    setting the virtual age zone equal to the current major age zone step value minus one when the current value of the minor age zone step value is less than the sequence number; and
    removing the entry from the table when the age stamp is a function of the virtual age zone, wherein the age zone is associated with a first timer comprising a plurality of predefined zone periods, wherein each minor age zone is associated with a second timer, and wherein a complete cycle of the second timer represents one of the plurality of predefined zone periods.

26. The method of claim 25 wherein the age stamp is a function of the virtual age zone when the age stamp is equal to the virtual age zone plus one.

27. The method of claim 25, wherein the age zone is defined by a predetermined period of time.

28. The method of claim 27, wherein the age zone has a major age zone step value that is incremented each time the predetermined period of time ends.

29. A method of staggering periodic stamping of entries in a table, comprising:
- dividing, by using a processor, an age zone into a plurality of minor age zones, each having a minor age zone step value;
- assigning a sequence number that corresponds to one of the minor age zone step values to a table entry;
- setting a virtual age zone based on a major age zone, minor age zone, and sequence number; and setting an age stamp for the entry equal to the virtual age zone value when the entry is accessed after a virtual age zone change, wherein the age zone is associated with a first timer comprising a plurality of predefined zone periods, wherein each minor age zone is associated with a second timer, and wherein a complete cycle of the second timer represents one of the plurality of predefined zone periods.

30. The method of claim 29, wherein setting a virtual age zone based on the major age zone, minor age zone, and sequence number includes:
- setting the virtual age zone equal to a current major age zone step value when the current value of the minor age zone step value is greater than or equal to the sequence number; and
- setting the virtual age zone equal to the current major age zone step value minus one when the current value of the minor age zone step value is less than the sequence number.

* * * * *

UNITED STATES PATENT AND TRADEMARK OFFICE
CERTIFICATE OF CORRECTION

PATENT NO. : 7,668,948 B2  Page 1 of 1
APPLICATION NO. : 10/334248
DATED : February 23, 2010
INVENTOR(S) : Prasad et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2048 days.

Signed and Sealed this

Seventh Day of December, 2010

David J. Kappos
*Director of the United States Patent and Trademark Office*